(12) United States Patent
Bortell et al.

(10) Patent No.: US 12,042,884 B2
(45) Date of Patent: Jul. 23, 2024

(54) LAMINATE INCLUDING ALUMINUM SHEETS

(71) Applicant: Material Sciences Corporation, Elk Grove Village, IL (US)

(72) Inventors: Peter Bortell, Tecumseh, MI (US); Bryan Tullis, Livonia, MI (US)

(73) Assignee: Material Sciences Corporation, Canton, MI (US)

( * ) Notice: Subject to any disclaimer, the term of this patent is extended or adjusted under 35 U.S.C. 154(b) by 38 days.

(21) Appl. No.: 17/946,352

(22) Filed: Sep. 16, 2022

(65) Prior Publication Data

US 2023/0015873 A1 Jan. 19, 2023

Related U.S. Application Data

(60) Division of application No. 15/729,100, filed on Oct. 10, 2017, now abandoned, which is a continuation of
(Continued)

(51) Int. Cl.
*B23K 35/02* (2006.01)
*B32B 7/12* (2006.01)
(Continued)

(52) U.S. Cl.
CPC ............ *B23K 35/0255* (2013.01); *B32B 7/12* (2013.01); *B32B 15/01* (2013.01); *B32B 15/016* (2013.01);
(Continued)

(58) Field of Classification Search
CPC ............ B23K 35/0255; B23K 2101/18; B23K 2101/006; B23K 2101/185; B23K 2103/10; B23K 2103/172; B23K 11/115; B23K 11/185; B23K 11/34; B23K 31/02; B23K 35/002; B23K 35/0238; B32B 7/12;
(Continued)

(56) References Cited

U.S. PATENT DOCUMENTS 3,243,321 A * 3/1966 Rowand ................. B05D 5/083
148/272
6,586,110 B1 * 7/2003 Obeshaw ................. B32B 3/12
428/116
(Continued)

FOREIGN PATENT DOCUMENTS

EP 0692371 A1 * 1/1996

*Primary Examiner* — Daniel H Lee

(57) ABSTRACT

A laminate structure and method of forming is provided. The laminate structure includes a first metal sheet having a first thickness, a second metal sheet having a second thickness, and an adhesive core having an adhesive thickness. The adhesive core is disposed between and bonded to the first and second metal sheets. The first and second metal sheets are made of an aluminum based material and the adhesive core is made of an adhesive material also described as a viscoelastic adhesive material. The laminate structure is configured such that a ratio of the sum of the first and second thickness to the adhesive thickness is greater than either to one (8:1). The laminate structure including the viscoelastic adhesive core is characterized by a composite loss factor at 1,000 Hertz which is continuously greater than 0.1 within a temperature range of 25 degrees Celsius to 50 degrees Celsius.

10 Claims, 2 Drawing Sheets

Related U.S. Application Data application No. PCT/US2015/028801, filed on May 1, 2015.

(51) Int. Cl.
*B32B 15/01* (2006.01)
*B32B 15/04* (2006.01)
*B32B 15/20* (2006.01)
*B32B 37/06* (2006.01)
*B32B 37/12* (2006.01)
*B23K 101/18* (2006.01)

(52) U.S. Cl.
CPC ............ *B32B 15/04* (2013.01); *B32B 15/043* (2013.01); *B32B 15/20* (2013.01); *B32B 37/06* (2013.01); *B32B 37/12* (2013.01); *B23K 2101/18* (2018.08); *B32B 2255/06* (2013.01); *B32B 2255/205* (2013.01); *B32B 2264/101* (2013.01); *B32B 2264/105* (2013.01); *B32B 2264/107* (2013.01); *B32B 2305/30* (2013.01); *B32B 2307/10* (2013.01); *B32B 2307/202* (2013.01); *B32B 2311/24* (2013.01); *B32B 2319/00* (2013.01)

(58) Field of Classification Search
CPC ....... B32B 15/01; B32B 15/016; B32B 15/04; B32B 15/043; B32B 15/20; B32B 37/06; B32B 37/12; B32B 2255/06; B32B 2255/205; B32B 2264/101; B32B 2264/105; B32B 2264/107; B32B 2305/30; B32B 2307/10; B32B 2307/202; B32B 2311/24; B32B 2319/00; C08K 3/08; C08K 3/40; C08K 2003/0806; C08K 2003/0812; C08K 2003/0856; C08K 2003/0893; C08K 2201/001; C09J 9/02; C09J 11/04; C09J 2301/408; C09J 2400/163; C09J 5/06

See application file for complete search history.

(56) References Cited

U.S. PATENT DOCUMENTS

| | | | |
|---|---|---|---|
| 8,292,029 B2* | 10/2012 | Martin | A62B 35/0037 182/7 |
| 2006/0062977 A1* | 3/2006 | Sigler | B32B 5/16 428/209 |
| 2006/0134449 A1* | 6/2006 | Sigler | B32B 27/18 428/624 |

* cited by examiner

LAMINATE INCLUDING ALUMINUM SHEETS

CROSS REFERENCES TO RELATED APPLICATIONS

This divisional application claims the benefit of and priority to U.S. patent application Ser. No. 15/729,100 filed Oct. 10, 2017. U.S. patent application Ser. No. 15/729,100 filed Oct. 10, 2017 claims the benefit of International Patent Application PCT/US2015/028801 filed May 1, 2015, which is hereby incorporated by reference in its entirety.

TECHNICAL FIELD

The present disclosure relates to a laminate of metal sheets including a core layer disposed between and connected to the metal sheets, and specifically, to a laminate including metal sheets of an aluminum material.

BACKGROUND

Monolithic (solid) aluminum sheet is substantially less dense than a monolithic (solid) steel sheet of the same thickness, such that the monolithic aluminum sheet and/or structural components formed therefrom presents a substantial weight savings over the monolithic steel sheets and/or like components formed therefrom. The monolithic aluminum sheet may be noisier, e.g., may exhibit less favorable noise-vibration-harshness (NVH) characteristics as compared with the monolithic steel sheet, due to the density differences of the materials, where the monolithic aluminum sheet is more susceptible to vibration and resonance and more sensitive to frequency management than the monolithic steel sheet. Components formed from monolithic aluminum sheet and/or monolithic steel sheet often require modifying the components by adding damping coatings and/or damping componentry such as damping patches, for the components to provide acceptable NVH behavior. Such added treatments, coatings and/or damping componentry add cost and weight to the component formed from monolithic sheet. As such, it is desirable to provide a sheet material which provides a weight savings relative to monolithic steel sheet with improved damping characteristics relative to monolithic aluminum sheet, which is formable into structural components.

SUMMARY

A laminate structure and method of forming is described. The laminate structure, which includes a viscoelastic adhesive layer between and bonding aluminum sheets, is advantaged by being formable into a structural component which provides desired levels of vibration damping, sound transmission loss, structural separation, etc. at a substantially lower weight relative to a structural component formed of a monolithic metal sheet, and without requiring added treatments, such as sound dampening coatings or patches, to achieve the desired NVH performance. A structural component, as that term is used herein, refers to a component formed from sheet material which has a complex shape, e.g., a shape other than flat sheet, and is used in a structural application. For example, the complex shape of a structural component can be defined by one or more features, such as one or more of a bend, rib, aperture, bead, offset, chamfer, depression, channel, curve, contour, extruded portion, or other feature formed into the laminate structure to define the structural component. The formed features defining the structural component create discontinuities in the flatness of the laminate structure which dissipate noise and increase sound transmission loss across, e.g., through, the structural component formed from the laminate structure. As such, the laminate structure described herein can be formed into structural components where there is a particular need for noise dissipation, vibration and/or sound damping, structural separation, thermal insulation and/or acoustic absorption, for example, between spaces or areas separated by the structural component(s) formed of the laminate structure. The term "structural component" is non-limiting, such that a structural component may have nominal or minimal load bearing requirements. In a non-limiting example, the laminate structure described herein is formable into structural components for vehicle applications, such as close-out panels, also known as dash panels or trunk panels, which provide structure to the vehicle by separating, respectively, the engine compartment or trunk compartment from the passenger compartment. Other non-limiting examples of vehicle structural components which may be formed from the laminate structure include wheel well liners, powertrain tunnel covers, floor pans, etc.

A laminate structure and method of forming is provided. The laminate structure includes a first metal sheet having a first thickness, a second metal sheet having a second thickness, and an adhesive core having an adhesive thickness. The adhesive core is disposed between and bonded to the first and second metal sheets. The first and second metal sheets are made of an aluminum based material and the adhesive core is made of an adhesive material which may also be described herein as a viscoelastic adhesive material. The adhesive core, in a non-limiting example, can be made of one of a phenolic modified rubber material, an acrylic based material, and a polyester based material. The laminate structure is configured such that a ratio of the sum of the first and second thickness to the adhesive thickness is greater than eight to one (8:1). In a non-limiting example, the ratio of the sum of the first and second thickness to the adhesive thickness is greater than twenty-five to one (25:1). The laminate structure including the viscoelastic adhesive core is a damping structure characterized by a composite loss factor which is continuously greater than 0.1 within a predetermined temperature range defined by the application of the component formed from the laminate structure. In one example, the laminate structure is characterized by a composite loss factor which is continuously greater than 0.1 within a temperature range of 25 degrees Celsius to 50 degrees Celsius.

By way of example, the thickness of the first metal sheet is within a range of 0.4 mm to 2.0 mm, the thickness of the second metal sheet is within a range of 0.4 mm to 2.0 mm, and the adhesive thickness, e.g., the thickness of the adhesive core, is within a range of 0.013 mm to 0.076 mm. The density of the laminate structure is substantially similar to the density of monolithic aluminum, such that the density of the laminate structure is in a range of 2.56 gm/cc to 2.70 gm/cc. The laminate structure is characterized by one or more of an n value of 0.1 or greater, an r value of 0.8 or greater, an adhesive strength as measured by T-peel of at least 1.75 Newtons/millimeter (N/mm), and a lap shear strength of at least 2 mega-Pascal (MPa).

By way of example, the laminate structure includes an intermediate layer disposed between the adhesive layer and a surface of one of the first and second metal sheets, where the intermediate layer is a passivation layer acting to passivate the surface of one of the first and second metal sheets.

The laminate structure may further include an auxiliary layer disposed between the intermediate layer and the adhesive core and configured such that the auxiliary layer is a corrosion prevention layer to prevent the formation of corrosion at the bonding interface between the adhesive core and the metal sheet. In one example, an isolation layer is bonded to one of the first and second metal sheets such that the isolation layer forms an exterior layer of the laminate structure.

In one example, the adhesive core includes a plurality of filler particles. In a non-limiting example, the filler particles are made of an electrically conductive material, such as aluminum, and are arranged in the adhesive core such that the plurality of filler particles define an electrically conductive path between the first and second metal sheets such that the laminate structure can be joined by welding to another metallic component or structure. In the present example, each of the adhesive core including the plurality of filler particles, the first metal sheet, and the second metal sheet exhibit substantially the same electrical conductivity such that the laminate structure is weldable, e.g., is attachable by resistance welding to another component or structure.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
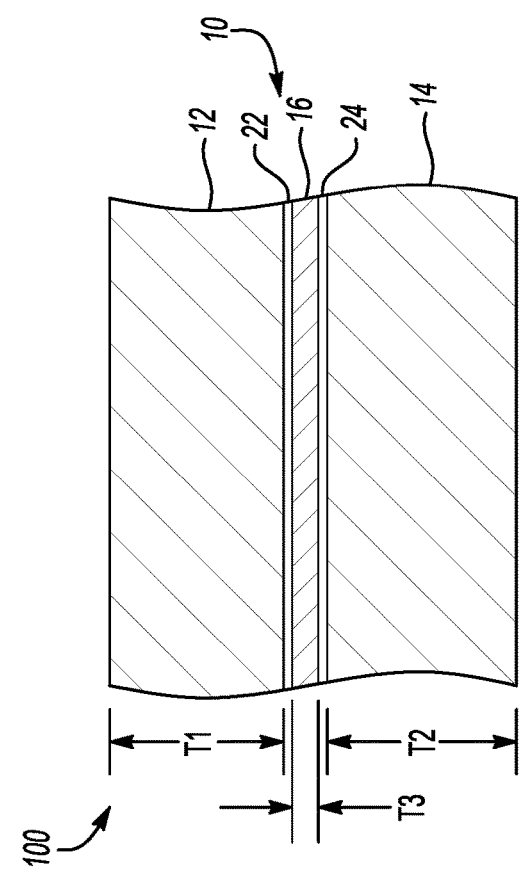
FIG. 1 is a schematic view of a cross-section of a first example laminate structure including a core layer disposed between aluminum sheets.

The elements shown in FIGS. 1-5 are not necessarily to scale or proportion, and the arrangement of elements shown in FIGS. 1-4 are not intended to be limiting. Accordingly, the particular dimensions and applications provided in the drawings presented herein are not to be considered limiting. Referring to the drawings wherein like reference numbers represent like components throughout the several figures, there is shown in FIGS. 1-4 a laminated material generally indicated at 100, also referred to herein as a laminate structure or as a laminate. The laminate 100 includes opposing metal sheets 12, 14 which are connected by a core layer 10 disposed therebetween. Each of the metal sheets 12, 14 is made of an aluminum based metal. The term "sheet" as used herein in the context of aluminum materials is understood as being a rolled aluminum alloy product with a uniform thickness of less than 6 mm. By way of non-limiting example, each of the metal sheets 12, 14 may be referred to herein as a skin, metal layer, aluminum sheet, substrate, and/or base substrate. The core layer 10 includes an adhesive core 16 which has NVH characteristics such that the core layer 10 in combination with the aluminum sheets 12, 14 provide a laminate structure 100 which is characterized as a noise damping material exhibiting composite loss factor characteristics as shown by exemplary lines 44, 46, 48 in FIG. 5. The adhesive core 16 may also be referred to herein as a viscoelastic core 16, and/or the adhesive core 16 may be characterized as being formed of a viscoelastic material and/or having viscoelastic properties, such that the viscoelastic core 16 substantially defines the damping properties of the laminate structure 100. The core layer 10 is disposed between the aluminum sheets 12, 14 such that the core layer 10 spans substantially the entirety of (i.e., is coextensive with) the metal layer 12 and the metal layer 14, adhering (i.e., rigidly attaching) the two aluminum sheets 12, 14 together such that the core layer 10 is constrained by the metal layers 12, 14. Notably, the laminate structure 100 may include additional layers such as additional substrate layers and coating layers, and the core layer 10 may include a plurality of layers including one or more adhesive layers, sound-damping viscoelastic layers, coating layers, electrically or thermally conductive layers, corrosion prevention layers, etc. such that it would be understood that the examples shown in FIGS. 1-4 are illustrative and are not intended to be limiting.

The laminate structure 100 described herein may be formed into structural components where there is a particular need for enhancing structural reinforcement, vibration and/or sound damping, thermal insulation and/or acoustic absorption, for example, between spaces or areas separated by the structural component(s) formed of the laminate structure 100. The laminate structure 100 described herein, including aluminum sheets 12, 14 and core layer 10, is advantaged by being formable into a structural component which provides desired levels of vibration damping, sound transmission loss, structural separation, etc. at a substantially lower weight relative to a structural component formed of a steel based material. The laminate structure 100 is advantaged by being formable into a structural component which provides desired levels of vibration damping, sound transmission loss, etc. at a substantially lower weight relative to a structural component formed from a monolithic metal sheet, and without requiring added treatments, such as sound dampening coatings or patches, to achieve the desired NVH performance. A structural component, as that term is used herein, refers to a component formed from sheet material which has a complex shape, e.g., a shape other than flat sheet, and is used in a structural application. For example, the complex shape of a structural component can be defined by one or more features, such as one or more of a bend, rib, aperture, bead, offset, chamfer, depression, channel, curve, contour, extruded portion, or other feature formed into the laminate structure to define the structural component. In the example described herein, the formed features defining a structural component formed from the laminate structure 100 create discontinuities in the flatness of the laminate structure 100 which lowers the sound power transmitted through the structural component formed from the laminate structure 100 and/or increases the sound transmission loss (STL) across and/or through, the structural component formed from the laminate structure 100. The formed features defining a structural component formed from the laminate structure 100 create discontinuities in the laminate structure 100 which can change the frequency of sound waves as the sound waves are transmitted through the laminate structure 100. For example, discontinuities created by formed features in a component formed from the laminate structure 100 modify and/or change resonant frequencies of sound waves transmitted through the laminate structure 100, relative to the transmission of sound waves through a monolithic (solid) material. As such, the laminate structure 100 described herein can be formed into structural components where there is a particular need for noise dissipation, vibration and/or sound damping, thermal insulation and/or acoustic absorption, for example, between spaces or areas separated by the structural component(s) formed of the laminate structure 100. The term "structural component" is non-limiting, such that a structural component can include components having formed features which have nominal or minimal load bearing requirements, although it would be understood that formed features such as ribs, channels, beads, or other geometric formed features included in a component formed from the laminate structure 100 can increase the stiffness and/or rigidity of the component. In a non-limiting example, the laminate structure 100 described herein is formable into structural components for vehicle applications, such as close-out panels, also known as dash panels or trunk panels, which provide structure to the vehicle by separating, respectively, the engine compartment or trunk compartment from the passenger compartment. Other non-limiting examples of vehicle structural components which may be formed from the laminate structure 100 include wheel well liners, powertrain tunnel covers, floor pans, etc. In a non-limiting example, the core layer 10 may be electrically conductive and/or the aluminum sheet 12, 14 may be coated such that the laminate structure 100 can be joined by welding to another metallic component or structure.

In a preferred example the aluminum based material comprising aluminum sheets 12, 14 is one of a 5xxx and 6xxx series aluminum alloy having elongation greater than 15%, preferably greater than 20%, and more preferably having an elongation of at least 25%, and having an n value of at least 0.1 and an r value of at least 0.8, where then and r values characterize formability of the aluminum sheet 12, 14. The "n value" as used herein is understood as being the strain hardening exponent obtained by calculating the slope of the true stress and true strain curve of the material, where it is understood that increasing the n value increases the formability of the material. The "r value" as used herein is understood as being the Lankford value, also referred to as the Lankford coefficient, plastic strain ratio, and/or plastic anisotropy factor, and is a measure of the ratio of the true width (or lateral) strain to the true thickness strain in a tensile test of the aluminum sheet 12, 14. The r value indicates the capacity of an aluminum sheet to resist thinning, where it is understood that the higher the r value, the greater the resistance to thinning during deep drawing. A 5xxx or 6xxx series aluminum alloy is preferred for aluminum sheets 12, 14 to provide high elongation and a heat stable structure such that the base substrates, e.g., the aluminum sheets 12, 14, provide strength and stiffness while being formable, for example, by stamping, extrusion, deep drawing, etc. The aluminum material forming the aluminum sheets 12, 14 may be ¼ hard or lower, such that the aluminum sheets 12, 14 are readily formable. For example, the aluminum sheets 12, 14 may be provided in an annealed temper condition also known as an "OT" temper, or in a strain hardened tempered ¼ hard condition also known as an "H2" temper. In one example, a laminate structure 100 usable for forming automotive components such as dash panels is formed of aluminum sheets 12, 14 of a 6xxx series aluminum alloy provided with an OT temper, such that the laminate structure 100 is readily formable by pressing and/or stamping into complex shapes such as dash panels, and is heat treatable, for example, during paint baking of the dash panels and/or vehicle including the dash panels formed from the laminate structure 100. The example of a 5xxx or 6xxx series aluminum alloy material used for forming aluminum sheets 12, 14 is non-limiting, and it would be understood that other aluminum alloys may be used to form aluminum sheets 12, 14.

By way of non-limiting example and referring to FIG. 1, the thickness T1, T2 of each aluminum sheet 12, 14 is in the range of 0.4 mm to 2.0 mm. In a preferred example, the thickness T1, T2 of each aluminum sheet 12, 14 is in the range of 0.5 to 1.0 mm. In a more preferred example, the thickness T1, T2 of each aluminum sheet 12, 14 is within the range of 0.6 mm to 0.8 mm. The thickness T1, T2 of the aluminum sheets 12, 14 may be, but is not required to be, the same thickness. For example, the thickness T1 of aluminum sheet 12 may differ from the thickness T2 of aluminum sheet 14 as required by a particular use of the laminate structure 100, and/or as required to form a particular component from the laminate structure 100 and/or to provide functional characteristics such as strength, stiffness, etc. required by the particular component formed from the laminate structure 100. The combined (total) thickness of the aluminum sheets 12, 14 and the adhesive core 16 is controlled such that the laminate structure 100 is characterized by an n value of at least 0.1, an r value of at least 0.8, an adhesive strength as measured by T-peel of at least 10 pounds-force/inch and a lap shear strength of at least 2 mega-Pascal such that the laminate structure 100 is formable into structure components by stamping, bending, extrusion and the like without separation of the adhesive core 16 from the aluminum sheets 12, 14 or fracturing of the aluminum sheets 12, 14. The examples are illustrative and non-limiting, and it would be understood that one of the aluminum sheets 12 could be a different aluminum material, temper, and/or thickness than the other aluminum sheet 14.

The core layer 10 is disposed between the aluminum sheets 12, 14 such that the core layer 10 spans substantially the entirety of (i.e., is coextensive with) the metal layer 12 and the metal layer 14. The laminate structure 100 is formed by laminating the metal sheets 12, 14 with the core layer 10 disposed therebetween such that the core layer 10 adheres (i.e., rigidly attaches) the two aluminum sheets 12, 14 together. The core layer 10 includes an adhesive core 16, which substantially defines and/or provides the NVH (noise, vibration, harshness) and damping performance characteristics of the laminate structure 100. The core layer 10 and/or the adhesive core 16 has sufficient adhesive properties to attach the two aluminum sheets 12, 14 to each other, and has viscoelastic properties such that it dissipates vibrational energy by converting the vibrational energy into thermal energy through internal shearing of the adhesive material, such that the core layer 10 and/or the adhesive core 16 acts as a damping layer to damp sound power introduced on a source side of the laminate structure 100 relative to the sound power transmitted from a receiver side of the laminate structure 100. A sound transmission loss (STL) factor of the laminate structure 100, or, for example, a component formed from the laminate structure 100, can be expressed as a ratio of the sound power on the source side of the component formed from the laminate structure 100 with respect to the sound power on the received side of the component formed from the laminate structure 100, where it would be understood that the source side of the component formed from the laminate structure 100 is that side of the laminate structure 100 or component formed therefrom where the source of the sound (i.e., noise) is located, and the received side of the component formed from the laminate structure 100 is the side of the laminate structure 100 opposing the source side where the sound is received (i.e., sensed), such that the component formed from the laminate structure 100 is disposed between the source side and the received side. In a non-limiting example of an automotive component (not shown) formed from the laminate structure, such as an automotive body panel, dash panel, trunk panel, floor pan, engine tunnel cover, wheel well liner, etc., formed from the laminate structure 100, the noise or source of the sound may be road noise, powertrain or driveline noise, noise from an engine or trunk compartment, aerodynamic noise from the exterior of the vehicle, etc., exerting a sound power on the exterior facing side (relative to the vehicle) of the component formed from the laminate structure 100, such that the received sound power is the power of the sound sensed in the interior of the vehicle, e.g., by a passenger in the vehicle, where the received side of the component formed from the laminate structure 100 is that side of the vehicle component formed from the laminate structure which is inwardly facing (relative to the vehicle), i.e., the interior side of the vehicle component. Formed features defining the structural component formed from the laminate structure 100 can create discontinuities in the flatness of the laminate structure 100 which dissipate noise and increase sound transmission loss across and/or through, the component formed from the laminate structure 100.

Figure 5:
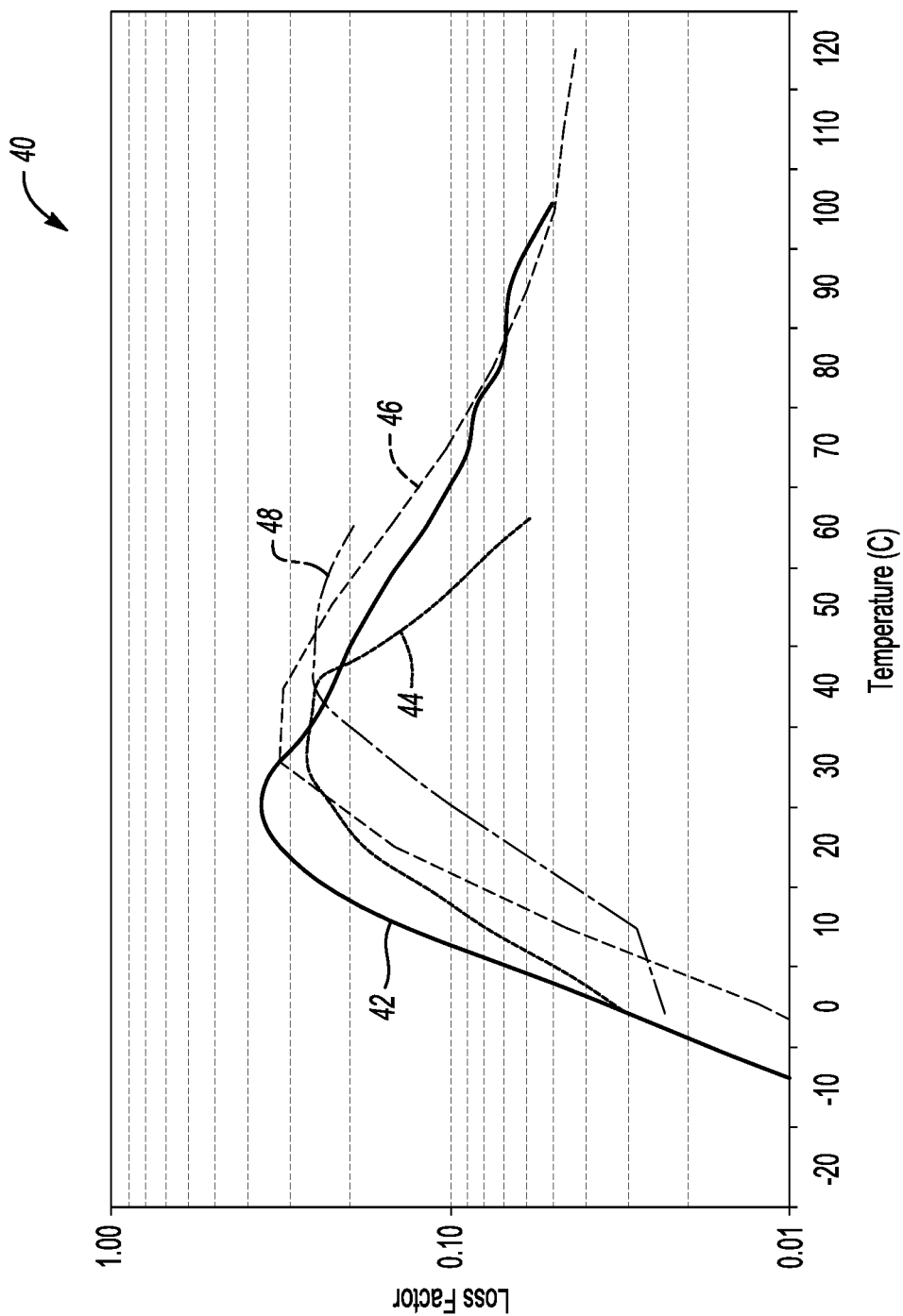
FIG. 5 is a graphical illustration of composite loss factor behavior of a plurality of laminate structures over a range of operating temperatures.

The damping and/or NVH behavior of the laminate structure 100 and/or a component formed therefrom may be expressed in terms of a composite loss factor, where the damping behavior and the composite loss factor or a laminate structure 100 is a function of frequency and is variable with the temperature at which the laminate structure 100 is operating, e.g., the temperature of the laminate structure in use in an application. As such, a laminate structure 100 is characterized by a composite loss factor curve such as one of the curves 44, 46, 48 of a composite loss factor graph 40 shown in FIG. 5, where the composite loss factor (CLF) is shown on the y-axis or vertical axis as shown on the page, and the operating temperature at which the corresponding CLF is exhibited is shown on the x-axis or horizontal axis as shown on the page. In the example shown in FIG. 5, the CLF values at plotted for a frequency of 1,000 Hertz (Hz). The temperature shown on the x-axis is the ambient temperature of the environment in which the laminate structure 100 is in use, such that the temperature shown on the x-axis of graph 40 is substantially the operating temperature of the laminate structure 100 at which the laminate structure 100 exhibits the corresponding CLF value shown on graph 40. In the example shown, each of the curves 44, 46, 48 represent the composite loss factor behavior of a respective one of a laminate structure 100 including aluminum sheets 12, 14 and a core layer 10. The CLF of a laminate structure 100 will vary, as shown in FIG. 5, with temperature. In a preferred example, a composite loss factor of greater than 0.10 (i.e. CLF>0.10) is desirable in a specified operating temperature range for the laminate structure 100 or a component formed therefrom. Referring again to FIG. 5, curve 42, provided for comparison, shows the CLF of a steel laminate structure formed of steel sheets attached by a viscoelastic core layer and having a density of 7.842 grams/cubic centimeter (gm/cc). By comparison, curve 46 shows the CLF of an aluminum laminate structure 100 formed of aluminum sheets 12, 14 attached by a viscoelastic core layer 10 and having a density of 2.71 gm/cc. Both the steel laminate structure represented by curve 42 and the aluminum laminate structure 100 represented by curve 46 have a desirable CLF of greater than 0.10 in a broad operating temperature range of 15 degrees Celsius to 65 degrees Celsius, however it would be understood that the aluminum laminate structure 100 of curve 46 is advantaged by a significantly lower density such that in a damping application the aluminum laminate structure 100 provides a substantial weight savings relative to a steel laminate structure providing comparable damping results.

Referring again to FIG. 1, in a non-limiting example the adhesive core 16, which provides the NVH performance, e.g., acts as the damping layer and attaches the aluminum sheets 12, 14 to each other to form the laminate structure 100. The adhesive core 16 acts as the damping layer by changing sound energy into heat via shear action of the adhesive material forming the adhesive core 16, and also acts to hold the aluminum sheets 12, 14 together during and after forming of a component from the laminate structure 100. The adhesive core 16 may be formed of a combination of one or more of adhesive materials including one or more of an acrylic, polyester, polyacrylate, phenolic, rubber and/or urethane based material. In a preferred example, the adhesive core 16 is formed of a viscoelastic material such as a phenolic modified rubber adhesive, a rubber phenolic blend, or a rubber-based viscoelastic material. In other examples the adhesive core 16 is formed of one of an acrylic material, an acrylic rubber hybrid material, a polyester material including a cross-linking agent, a rubber phenolic material, a polyester rubber phenolic material, a polyacrylate material, a polyester-based acrylic material, and a rubber phenolic blend. The adhesive core 16 may be applied to the aluminum sheets 12, 14 to provide a dry film thickness (DFT), e.g., an adhesive thickness T3 shown in FIG. 1, of the adhesive core 16 within the range of 0.0005 inches to 0.0030 inches (approximately 0.013 millimeters (mm) to 0.076 mm), where the damping performance of the laminate structure 100 and the thickness T3 of the adhesive core are inversely related, e.g., the damping performance of the laminate structure 100, expressed in one example as a composite loss factor of the laminate structure 100, improves as the thickness T3 of the adhesive core 16 is decreased. In a preferred example to achieve the desired damping performance of the laminate structure 100, the thickness T3 of the adhesive core 16 is within the range of 0.001 inches to 0.0020 inches (0.025 mm to 0.0508 mm). In a more preferred example, the thickness T3 of the adhesive core 16 is within the range of 0.0010 inches to 0.0012 inches (0.025 mm to 0.03 mm). In a most preferred example, the thickness T3 of the adhesive core 16 is less than 0.0010 inches (<0.025 mm), and/or within the range of 0.0005 inches to 0.0010 inches (0.0125 mm to 0.025 mm).

Figure 2:
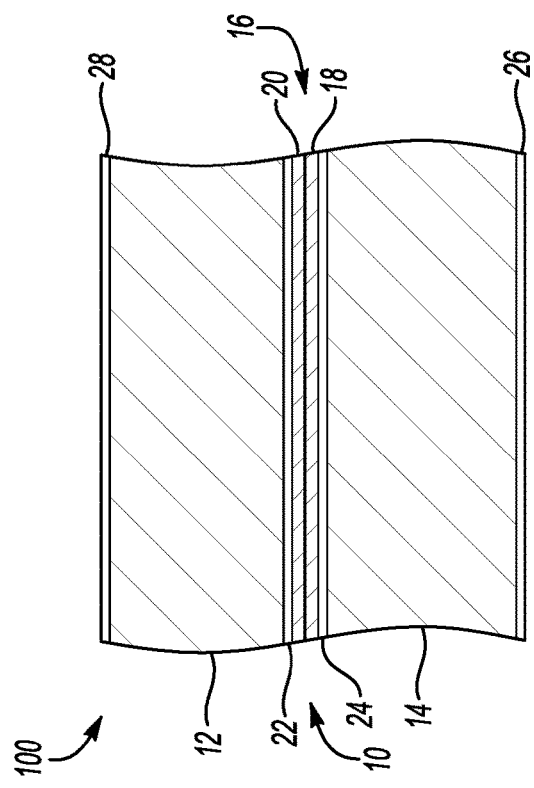
FIG. 2 is a schematic view of a cross-section of a second example laminate structure including a core layer disposed between aluminum sheets.

The adhesive material forming the adhesive core 16 may be applied to one of the aluminum sheets 12, 14 in a single layer prior to laminating the aluminum sheets 12, 14 together with the adhesive core 16 therebetween to form the laminate structure 100. In a preferred example, the adhesive material forming the adhesive core 16 may be applied in two adhesive layers 18, 20, as shown in FIG. 2, to form the adhesive core 16. For example, a first adhesive layer 18 may be applied to the aluminum sheet 14 and a second adhesive layer 20 may be applied to the aluminum sheet 12 prior to bringing the two aluminum sheets 12, 14 together during laminating. In the preferred example, the bond strength and/or peel strength of the laminate structure 100 including the first and second adhesive layers 18, 20 bonded to each other is substantially higher relative to a laminate structure 100 having an adhesive core 16 formed from a single layer of adhesive material applied to one of the aluminum sheets 12, 14 prior to laminating the lamination structure 100.

The thickness of each of the two adhesive layers 18, 20 is controlled to provide the desired total dry film thickness T3 of the adhesive core 16 in the finished laminate structure 100. By way of non-limiting example, the overall thickness of the laminate structure 100, exclusive of exterior layers 26, 28 and isolation layers 34, may be in the range of 0.813 mm to 4.76 mm. For example, a laminate structure 100 may include aluminum sheets 12, 14 each having a thickness T1, T2 of 0.4 mm and an adhesive core having a thickness T3 of 0.013 mm for a total thickness (T1+T2+T3) of 0.813 mm and an aluminum to adhesive thickness ratio of 61.5, where the aluminum to adhesive thickness ratio is calculated as (T1+T2)/T3. In another example, a laminate structure 100 may include aluminum sheets 12, 14 each having a thickness T1, T2 of 2.0 mm and an adhesive core having a thickness T3 of 0.076 mm for a total thickness of 4.076 mm and an aluminum to adhesive thickness ratio of 52.6. In a preferred example, the overall thickness of the laminate structure 100 may be in the range of 1.45 mm to 1.66 mm. For example, a laminate structure 100 in the preferred thickness range may include aluminum sheets 12, 14 each having a thickness T1, T2 of 0.6 mm and an adhesive core 16 having a thickness T3 of 0.025 mm for a total thickness of 0.1.45 mm. In another preferred example, a laminate structure 100 may include aluminum sheets 12, 14 each having a thickness T1, T2 of 0.8 mm and an adhesive core having a thickness T3 of 0.06 mm for a total thickness of 1.66 mm. In a preferred example, the ratio of the combined thickness (T1+T2) of the aluminum sheets 12, 14 to the thickness T3 of the adhesive core 16 is within the range of 25 to 50, where it would be understood that the thickness T1, T2 of the aluminum sheets 12, 14 substantially contributes the tensile strength and rigidity to the laminate structure 100, and the thickness T3 of the adhesive core 16 substantially contributes to the damping characteristics of the laminate structure 100, and where the thickness ratio influences the CLF behavior of the laminate structure 100. It would be understood that a thinner adhesive core 16 is desirable to contribute damping to the laminate structure 100 while minimizing impact on rigidity and tensile strength of the laminate structure 100. By way of example, the laminate structure 100 may be characterized by an adhesive thickness ratio in the range of 8:1 to 50:1. The laminate structure 100 having an aluminum to adhesive thickness ratio ((T1+T2)/T3) of 8:1 or more is characterized by a density substantially similar to that of monolithic (solid) aluminum, which has a density of 2.7 gm/cc. In a preferred example, a laminate structure 100 having an aluminum to adhesive thickness ratio ((T1+T2)/T3) of 25:1 has a density of at least 2.56 gm/cc, such that the density of the laminate structure 100 is at least 95% that of monolithic aluminum, contributing to the rigidity and strength of the laminate structure 100. In a preferred example, the laminate structure 100 has a density of at least 2.64 gm/cc.

The adhesive material of the adhesive layers 18, 20 may be, in a non-limiting example, one of a polyester based material which may be a cross-linking polyester, an acrylic based material which may optionally include a cross-linking agent to provide relatively higher resistance to chemical attack, and a phenolic modified rubber. In one example, the adhesive core 16 formed from the phenolic modified rubber material may be characterized by a matrix structure including rubber dispersed in a phenolic matrix such that bond strength of the laminate structure 100 is substantially defined by, e.g., resultant from, the bonding of the phenolic to the aluminum sheets 12, 14 and the bonding of the phenolic to the dispersed rubber particles. The adhesive material may be applied to the aluminum sheet 12, 14 by any suitable technique, including, for example, spraying, hot melt and/or rolling techniques by which the adhesive material is applied to the aluminum sheet 12, 14, and where the adhesive material may be used to ensure wetting out of the adhesive material which may be a solvent based adhesive material, on the aluminum sheet 12, 14, to provide full coverage of the aluminum sheet 12, 14 at the desired thickness prior to laminating the aluminum sheets 12, 14 together. In another example, the adhesive material may be provided as a dry adhesive film and applied to one or both of the aluminum sheets 12, 14 prior to laminating. The dry adhesive film can be applied, for example, in a continuous process where the dry adhesive film is interleaved between the aluminum sheets 12, 14 prior to laminating. The dry adhesive film may include a liner which is removed from the dry adhesive film after application of the film to the aluminum sheet 12, 14 and prior to laminating the aluminum sheets 12, 14 together. The adhesive material is heated and/or cured during the laminating process forming the laminate structure 100 by a means suitable to the type of the adhesive material being applied, which may include one or a combination of exposing the adhesive material to elevated temperatures, for example, using flame bars, incinerator ovens, hot air ovens, etc., and/or hot melt, infrared, and ultraviolet systems as understood by those knowledgeable in the field of laminating. The examples are non-limiting, and it would be understood that other forms of adhesive materials such as dry powder or web forms, application methods and curing processes may be used within the scope of forming the laminate structure 100 including the aluminum sheets 12, 14 and the core layer 10 described herein.

The adhesive material forming the core layer 10 and/or the adhesive core 16 is characterized by an elongation which is substantially greater than the elongation of the aluminum material comprising the aluminum sheets 12, 14, such that during deformation of the laminate structure 100, for example, during stamping, extrusion, and/or bending of the laminate structure 100 to form a component therefrom, the core layer 10 remains in an elastic range and does not separate from the edges of and/or between the aluminum sheets 12, 14 of the laminate structure 100, where it would be understood that separation of the adhesive core 16 from the aluminum sheets 12, 14 would affect the damping characteristics of the laminate structure 100 in the localized area where the separation occurred. By way of non-limiting example, the core layer 10 and/or the adhesive core 16 is characterized by a minimum elongation of 150%. In a preferred example, the core layer 10 and/or the adhesive core 16 is characterized by a minimum elongation of 300%, and in a more preferred example, an elongation in the range of 300% to 400%. Preferably, a minimum elongation ratio of ten (10) is maintained for the laminate structure 100, where the elongation ratio is expressed as the elongation of the core layer 16 relative to (divided by) the elongation of the thinner of the aluminum sheets 12, 14, to prevent fracture of the core layer 16 and maintain the damping capacity of the laminate structure 100. In a more preferred example, the laminate structure 100 is characterized by a minimum elongation ratio of twenty (20). In a most preferred example, the laminate structure 100 is characterized by a minimum elongation ratio in the range of twenty (20) to thirty (30). In one example, the laminate structure 100 includes 5XXX series aluminum sheets 12, 14 each having a thickness T1, T2 of 0.80 mm and an elongation in the range of 18% to 22% and a phenolic modified rubber adhesive core 16 having a nominal thickness T3 of 0.025 mm and an elongation of 300% such that the example laminate structure 100 is characterized by an elongation ratio of 13.6 to 16.7.

In a preferred example for forming the core layer 16 and laminate structure 100, an adhesive material is selected, applied to one or both of the aluminum sheets 12, 14, cured and laminated to provide a laminate structure 100 which is characterized by an adhesive strength as measured by T-peel of at least ten pounds-force/inch (10 lbf/in or approximately 1.75 Newtons/millimeter (N/mm)) using a T-peel strength test performed for example, in compliance with ASTM D1876 at a 10 inch/minute pull rate, a lap shear strength of at least two mega Pascal (2 MPa) a lap shear strength test performed for example, in compliance with ASTM D1002, a yield strength of 100-120 kilo-pounds per square inch (KSI) with an ultimate tensile strength of 200-250 KSI where plastic failure of at least one of the aluminum sheets 12, 14 occurs prior to plastic failure of the adhesive core 16. In a most preferred example, the laminate structure 100 is characterized by an adhesive strength as measured by T-peel of at least fifteen foot-pounds/inch (15 lbf/in or approximately 2.63 N/mm).

In a preferred example, the laminated structure 100 retains a minimum of 80% of the original bond strength, as indicated by lap shear strength and T-peel strength, after heat cycle aging, after thermal cycle (cold shock or cold/hot thermal cycling testing, for example, between −30 degrees C. and +105 degrees C.) testing, and after cyclic corrosion testing (for example, SAE J2334 testing), where the criteria for each of these is application specific for the intended use of the laminate structure 100 or a component formed therefrom. In one example, the laminate structure 100 is characterized by retaining 80% of the original bond strength after being subjected to heat cycle aging at 205 degrees Celsius for 40 minutes, to provide a laminate structure 100 which can be subjected during a coating process cycle such as electro-coating (electrostatic coating or E-coat) cycle or painting cycle to a baking operation where the laminate structure 100 is heated in a paint or e-coat oven in excess of 100 degrees Celsius and up to 205 degrees Celsius, without degradation of the laminate structure 100 or component formed therefrom. For example, such a laminate structure 100 is suitable for forming into an automotive component such as a dash panel, etc., which may be e-coated or painted. In the preferred example, the laminate structure 100 is able to withstand a 90 degree 1 T radius bend at 0.75 inch flange length without degradation, where T is the thickness of the laminate structure 100 expressed in inches, where in the present example the laminate structure 100 includes aluminum sheets 12, 14 made of 5xxx series aluminum material and an adhesive core 16 made of phenolic modified rubber, the laminate structure 100 having a total thickness of approximately 0.072 inches. The laminate structure 100 of the present example in an Olsen dome tensile test can be pressed by a 1 inch ball to a depth of 0.360 inches prior to rupture, e.g., prior to fracture of the aluminum sheet 12, 14. In a preferred example, a laminate structure 100 includes aluminum sheets 12, 14 made of 5xxx series aluminum material with an "O" temper to provide high elongation with relatively low tensile strength such that minimal springback occurs during and after forming of a component from the laminate structure 100, e.g., such that the laminate structure 100 exhibits forming characteristics similar to a deep draw grade ferrous material.

The laminate structure 100 exhibits a bending rigidity at room temperature (approximately 23 degrees Celsius) which is at least 35% that of a solid (monolithic) aluminum sheet having a thickness equal to the combined thickness (T1+T2) of the aluminum sheets 10, 12. In a preferred example, the laminate structure 100 exhibits a bending rigidity at room temperature of 50% or more relative to a monolithic aluminum sheet having a thickness equal to the combined thickness (T1+T2) of the aluminum sheets 10, 12. In a more preferred example, the laminate structure 100 exhibits a minimum bending rigidity at room temperature of 50% to 60% of that of a monolithic aluminum sheet having a thickness equal to the combined thickness (T1+T2) of the aluminum sheets 10, 12.

Referring to FIG. 5, the laminate structure 100 and components formed therefrom are advantaged by the combination of a light weight structure (relative to a steel structure of comparable thickness) and damping performance illustrated by the exemplary CLF curves 44, 46, 48 shown in graph 40 of FIG. 5. In a preferred example, a composite loss factor of greater than 0.10 (i.e. CLF>0.10) is desirable in a specified operating temperature range for the laminate structure 100 or a component formed therefrom to provide damping in at the specified operating temperature. Referring again to FIG. 5, curve 42 is provided for comparison and shows the CLF of a steel laminate structure formed of steel sheets attached by a viscoelastic core layer and having a density of 7.842 gm/cc. By comparison, curve 46 shows the CLF of an aluminum laminate structure 100 formed of aluminum sheets 12, 14 attached by a viscoelastic core layer 10 and having a density of 2.71 gm/cc. Both the steel laminate structure represented by curve 42 and the aluminum laminate structure 100 represented by curve 46 have a desirable CLF of greater than 0.10 in a broad operating temperature range of 15 degrees Celsius to 65 degrees Celsius, such that the aluminum laminate structure 100 and the steel laminate structure have comparable damping capabilities, however it would be understood that the aluminum laminate structure 100 of curve 46 is advantaged by a significantly lower density, e.g., a density which is 34.5% that of the steel laminate of curve 42, such that in a damping application the aluminum laminate structure 100 provides a substantial weight savings relative to a steel laminate structure while providing comparable damping results.

Curves 44, 46 and 48 provide illustrative comparative examples of laminate structures 100 each including aluminum sheets 12, 14 and a viscoelastic adhesive core 16, having similar density and stiffness, and substantially the same aluminum to adhesive thickness ratio, however differing in the adhesive material used to form the adhesive core 16. As such, a comparison of the curves 44, 46, 48 illustrates the influence of the adhesive material used to form the adhesive core on the CLF behavior of the resulting laminate structure 100, and specifically the influence of the adhesive material forming the adhesive core 16 on the temperature range in which the laminate structure 100 exhibits a CLF at or above the desired CLF value of 0.1. For example, curve 44 corresponds to a laminate structure 100 including an adhesive core 16 formed of a phenolic modified rubber material exhibiting a CLF continuously above 0.1 in the temperature range of approximately 12 degrees Celsius to 52 degrees Celsius, such that the laminate structure 100 of curve 44 demonstrates desirable damping characteristics at +/−10 degrees Celsius from room temperature, where room temperature is understood to be 23 degrees Celsius on average. Curve 46 corresponds to a laminate structure 100 including an adhesive core 16 formed of an acrylic material, and exhibiting a CLF continuously above 0.1 in the temperature range of approximately 15 degrees Celsius to 70 degrees Celsius, such that the laminate structure 100 corresponding to curve 46 can be used in environments requiring damping at relatively higher operating temperatures. Curve 48 corresponds to a laminate structure 100 including an adhesive core 16 formed of a cross-linked polyester material, and exhibiting a CLF continuously above 0.1 in the temperature range of approximately 25 degrees Celsius to at least 60 degrees Celsius. As shown on FIG. 5, each of the example curves 44, 46, 48 illustrate a laminate structure 100 having a CLF which is continuously above (greater than) 0.1 for operating temperatures ranging from room temperature (approximately 23 degrees Celsius) up to at least 50 degrees Celsius.

As shown in FIG. 1, the core layer 10 may include one or more intermediate coating or treatment layers 22, 24 which may be referred to herein as intermediate layers 22, 24. In the example shown, a first intermediate layer 22 is disposed between the adhesive core 16 and the aluminum sheet 12 such that the intermediate layer 22 spans substantially the entirety of (i.e., is coextensive with) the aluminum sheet 12 and the adhesive core 16, and a second intermediate layer 24 is disposed between the adhesive core 16 and the aluminum sheet 14 such that the intermediate layer 24 spans substantially the entirety of (i.e., is coextensive with) the aluminum sheet 14 and the adhesive core 16. The example shown in FIG. 1 is non-limiting, and it would be understood that the laminate structure 100 may be constructed including both of the intermediate layers 22, 24, one of the intermediate layers 22, 24, or neither of these. The intermediate layer 22, 24 prepares the surface of the respective aluminum sheet 12, 14 to which it is applied, to passivate the surface of the aluminum sheet 12, 14 to increase the surface bonding potential of the respective aluminum sheet 12, 14 to bond with the adhesive material of the adhesive core 16, and/or to resist corrosion at the bond interface between the adhesive core 16 and the respective aluminum sheet 12, 14 to prevent degradation of the bond between the adhesive core 16 and the respective aluminum sheet 12, 14, for example, by preventing formation of a corrosion product at the bond interface.

The aluminum sheet 12, 14 may be prepared, e.g., pre-treated, prior to applying the intermediate layer 22, 24 by cleaning the aluminum sheet 12, 14 with a deoxidation cleaner such as an alkaline cleaner or an acidic cleaner to remove soil, oil, grease, etc. from the surface of the aluminum sheet 12, 14 and to remove any aluminum oxide product from the surface of the aluminum sheet 12, 14, to prepare the surface of the aluminum sheet 12, 14 to receive the intermediate layer 22, 24. As such, the deoxidation cleaner creates a "fresh" aluminum surface which, if not subsequently treated, e.g., coated, within a period of time, will reoxidize. As such, the deoxidation cleaner removes the oxide layer from surface of the aluminum sheet 12, 14 to temporarily increase bonding receptivity of the aluminum sheet, for example, to one of the layers 22, 24, 24, 32 described further herein. In a non-limiting example, the aluminum sheet 12, 14 may be cleaned and/or pretreated applying the cleaning solution using, for example, immersion cleaning, spray cleaning, rolling on the cleaning solution, or using other suitable chemical cleaning means to apply the deoxidation cleaner. In another example, the aluminum sheet 12, 14 may be mechanically cleaned to deoxidize, e.g., remove the oxide layer from, the surfaces of the aluminum sheet 12, 14.

In one example, the intermediate coating 22, 24 may be applied at a coating weight thickness (CWT) in the range of 2.0 to 10.0 milligram/square meter (mg/m$^2$) by spraying the intermediate coating 22, 24 in solution form onto the aluminum sheets 12, 14 or immersing the aluminum sheets 12, 14 in the coating solution. In one example, the intermediate coating 22, 24 is applied as a solution containing titanium and zirconium which passivates the aluminum surface of the aluminum sheet 12, 14, and prevents activation of the aluminum surface over time. In another example, the intermediate coating 22, 24 is applied as a solution containing tri-chromium oxide. The coating solution may also be applied to the exterior surfaces, e.g., the outwardly facing surfaces, of the aluminum sheets 12, 14 to form exterior coating layers 28, 26, as shown in FIG. 2, to passivate and/or increase the surface bonding potential of the exterior (outwardly facing) surface of the aluminum sheet 12, 14, as a pretreatment for further coating and/or painting of the laminate structure 100 or a component formed therefrom, and/or to provide a corrosion prevention coating 26, 28 on the laminate structure 100.

Figure 3:
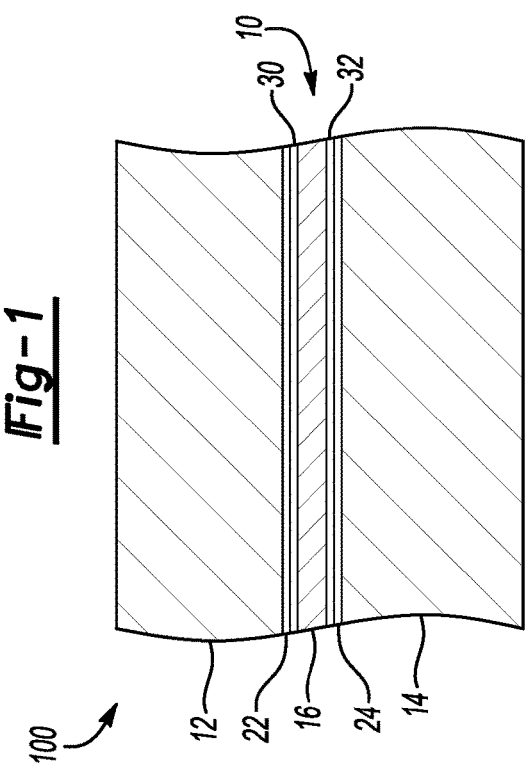
FIG. 3 is a schematic view of a cross-section of a third example laminate structure including a core layer disposed between aluminum sheets.

As shown in FIG. 3, an auxiliary coating layer 30, 32 may be applied between the intermediate layer 22, 24 and the core layer 16 such that the auxiliary coating layer 30, 32 spans substantially the entirety of (i.e., is coextensive with) the core layer 16. Each of the auxiliary coating layers 30, 32 may also be referred to herein as an auxiliary layer 30, 32. In one example, the auxiliary layer 30, 32 may be a titanium and zirconium containing coating similar to the passivation layer 22, 24, such that the laminate structure 100 includes first and second layers 22, 30 between the adhesive core 16 and the aluminum sheet 12 and first and second layers 24, 32 between the adhesive core 16 and the aluminum sheet 14, where the dual layering of the titanium-zirconium containing layers 22, 30 and 24, 32 first passivates the aluminum surface then increases the receptivity of bonding of the adhesive core 16 to the aluminum sheet 12, 14. The increased receptivity provided by the dual layering increases the bond strength at the bond interface between the adhesive core 16 and the aluminum sheet 12, 14 resulting in a relatively higher peel strength, for example, greater than 10 lbf/in, while retaining the desired damping performance, for example, a CLF of greater than 0.1 within +/−10 degrees Celsius of the target operating (in use) temperature of the laminate structure 100 and/or a component formed therefrom.

Figure 4:
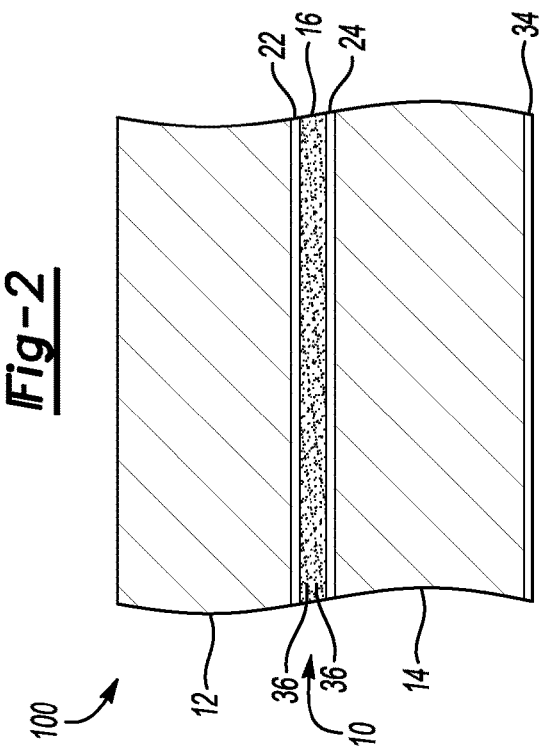
FIG. 4 is a schematic view of a cross-section of a fourth example laminate structure including a core layer disposed between aluminum sheets.

In one example, the laminate structure 100 may include at least one of the auxiliary layer 30, 32 which is a corrosion prevention layer to prevent contaminant ingression at the bonded interface between the adhesive core 16 and the adjacent aluminum sheet 12, 14, for example, by preventing contaminant ingression at an exposed edge of the laminate structure 100. In another example, the laminate structure 100 may include at least one auxiliary layer 30, 32 configured as a thermal coating to modify the thermal emissivity and/or thermal conductivity of the laminate structure 100. For example, at least one auxiliary layer 30, 32 may be made of a heat dissipating material to dissipate heat away from the adhesive core 16, or may be made of a heat absorptive material to absorb heat into the laminate structure 100. In another example, the laminate structure 100 may include at least one auxiliary layer 30, 32 configured as an electrically conductive layer to modify the electrical conductivity of the laminate structure 100. For example, the laminate structure 100 shown in FIG. 3 could include auxiliary layers 30, 32 which are made of or include an electrically conductive material, such as a carbon-based or graphite-based material or graphite film, and could further include an adhesive core as shown in FIG. 4, where the adhesive core 16 includes an electrically conductive filler 36 such as an aluminum particle filler or graphite filler such that the adhesive core and the auxiliary layers 30, 32 are electrically conductive and the laminate structure 100 is electrically conductive. The example shown in FIG. 3 is non-limiting, and it would be understood that the laminate structure 100 may be configured with one or both auxiliary layers 30, 32, with a plurality of auxiliary layers 30 disposed between the adhesive core 16 and the aluminum sheet 12, with a plurality of auxiliary layers 32 disposed between the adhesive core 16 and the aluminum sheet 14, and/or without either auxiliary layer 30, 32. It would be understood that each of the auxiliary layers 30, 32 may be similarly configured, e.g., be made of the same material and/or have the same thickness, or may be differently configured, e.g., made of different materials and/or have different thicknesses and/or be included to provide different functionalities (corrosion prevention, thermal conductivity, electrical conductivity, etc.) to the laminate structure 100.

Referring to FIG. 2, the laminate structure 100 may include one or more exterior coating layers 26, 28, which may be referred to herein as exterior coatings 26, 28 and/or as exterior layers 26, 28. In the example shown, an exterior layer 28 is applied to, e.g., bonded, adhered, laminated or otherwise attached to, the exterior (outwardly facing or outermost) surface of the aluminum sheet 12 such that the exterior layer 28 spans substantially the entirety of (i.e., is coextensive with) the aluminum sheet 12, and an exterior layer 26 is applied to, e.g., bonded, adhered, laminated or otherwise attached to the exterior (outwardly facing or outermost) surface of the aluminum sheet 14 such that the exterior layer 28 spans substantially the entirety of (i.e., is coextensive with) the aluminum sheet 12. The example shown in FIG. 2 is non-limiting, and it would be understood that the laminate structure 100 could be configured with one, both, or neither of the exterior layers 26, 28. The exterior coating layers 28, 26 may be configured to passivate and/or increase the surface bonding potential of the exterior (outwardly facing) surface of the aluminum sheet 12, 14, as a pretreatment for further coating and/or painting of the exterior surfaces of the laminate structure 100 or a component formed therefrom, and/or to provide a corrosion prevention coating 26, 28 on the laminate structure 100. The laminate structure 100 can include a plurality of exterior layers 26 and/or a plurality of exterior layers 28 applied in a predetermined sequence. By way of non-limiting example, the laminate structure 100 could include a first exterior layer 28 applied to, e.g., bonded, to the aluminum sheet 12, as a pretreatment for further coating and/or painting of the exterior (outwardly facing) surface of the aluminum sheet 12 with an additional exterior layer 28 which may be, by way of non-limiting example, a paint layer, a decorative coating layer, a corrosion protection layer, a thermal coating layer, etc. In one example, the exterior layer 26, 28 is a heat reflective thermal coating layer, such as a solar reflective layer, to reflect heat from and/or decrease heat absorption into the laminate structure 100. In another example, the exterior layer 26, 28 is a heat absorptive thermal coating layer, such as a low emissivity coating layer or black paint layer, to increase heat absorption into the laminate structure 100.

In one example, at least one of the exterior layers 26, 28 may be configured as an isolation layer 34, as shown in FIG. 4, where an "isolation layer" as that term is used herein, is a layer of material bonded to the laminate structure 100 to form an exterior layer of the laminate structure 100, and configured to prevent corrosion of the laminate structure 100 and/or to protect the aluminum layers 12, 14 to which the isolation layer 34 is applied, for example, from chemical attack and/or exposure to contaminants. In one example, the isolation layer 34 is configured to prevent galvanic corrosion when the laminate structure 100 and/or a component formed therefrom is in contact with, connected and/or fastened to a steel component. The isolation layer 34 may also be referred to herein as a galvanic isolation layer 34. In one example, the galvanic isolation layer 34 can consist of a polymer binder with zinc particles disbursed and embedded therein, with the polymer layer preventing corrosion by preventing ion transfer through the isolation layer, and the zinc particles preferentially, e.g., sacrificially, absorbing ions to prevent corrosion of the aluminum sheet 12, 14. The examples shown in the figures are non-limiting. For example, an exterior layer 26, 28 may be disposed between the aluminum sheet 14, 12 and a galvanic isolation layer 34. By way of example, the galvanic isolation layer 34 may be applied to one or both exterior surfaces of the laminate structure 100. In one example, organic coatings, including zinc rich primer coatings such as Granocoat® or Bonazinc™ and/or modified epoxy or polyester based weldable paints and/or primers may be used to form the isolation layer 34.

Referring to FIG. 4, the adhesive core 16 can include filler particles 36 distributed in the adhesive material forming the adhesive core 16. The size, shape, configuration, material, density and dispersion pattern of the filler particles 36 may be selected to provide a desired functional attribute of the core layer 10 and/or the adhesive core 16. The filler particles 36 may be coated, for example, with a wetting agent to provide for uniform dispersion and mixing of the filler particles 36 in the adhesive material forming the adhesive core 16. In one example, the adhesive core 16 is a phenolic modified rubber including a plurality of rubber filler particles 36. The phenolic bonds with the aluminum sheets 12, 14 and the rubber particles bond to the phenolic, to contribute bond strength and peel strength to the laminate structure 100. In another example, the filler particles 36 may be configured to modify the thermal conductivity of the laminate structure 100. In one example, the filler particles 36 may be configured to increase the insulating characteristics of the laminate structure. In another example, the filler particles 36 may comprise a high directional thermal conductivity material to increase the thermal dissipation from a point or localized source of the laminate structure 100, for example, when the laminate structure 100 is intended for use in a heat shielding application and thermal dissipation of heat away from the area being shielded by the laminate structure 100 is required. In one example, the filler particles 36 may be carbon particles, such as carbon nano-particles in the form of nanotubes, nanofibers or nanoflakes, dispersed in the adhesive core 16 to provide a thermal conductive path through the core layer 10. In another example, a graphite foil may be laminated between the adhesive layers 18, 20 to provide a heat conductive graphite structure, for heat shield or other thermal conductive applications of the laminate structure 100.

In one example, the filler particles 36 are electrically conductive and provided in a size and/or shape and are dispersed in the adhesive core 16 at a density or dispersion pattern such that the electrically conductive filler particles 36 provide a conductive path through the adhesive core 16 to form an electrically conductive laminate structure 100. The electrically conductive filler particles 36 may be configured such that the filler particles 36 and the aluminum sheets 12, 14 have substantially similar, e.g., substantially the same, conductivity, and such that the electrical resistance of the core layer 10 is substantially equal to or less than the electrical resistance of each of the aluminum sheets 12, 14, and such that the electrical resistance of the core layer 10 including the filler particles 36 is substantially less than the electrical resistance of the adhesive material in the adhesive core 16. In a non-limiting example, the electrically conductive filler particles 36 are an aluminum material containing at least 99.8% aluminum, such that the material chemistry and the electric potential of the filler particles 36 are substantially similar to that of the aluminum sheets 12, 14 to prevent galvanic corrosion of and/or the formation of a galvanic cell within the laminate structure 100. The adhesive material forming the adhesive core 16 may be configured to prevent ion transfer through the adhesive core 16 when an electrical current is conducted through the laminate structure 100, as an alternate means to prevent formation of a galvanic cell and/or to prevent galvanic corrosion of the laminate structure 100. The size, shape and dispersion of the filler particles 36 may be configured to provide a conductive path through the core layer 10 when the filler particles 36 are dispersed in the adhesive core 16. By way of non-limiting example, the aluminum filler particles 36 may be shaped as one or a combination of whiskers, shavings, fibers, spheroids, ellipsoids, ovoids, cylinders, polyhedrons, etc. which may be symmetrical and/or asymmetrical, and/or may be regular and/or irregular in shape. In one example, the aluminum filler particles may be approximately 0.030 millimeters (mm) in size, e.g., may have a major dimension (the largest dimension of the filler particle 36) which is in the range of 0.025 mm to 0.038 mm, such that the filler particle 36 is passable through a 400 mesh screen and retained by a 500 mesh screen, e.g., the particle size can be expressed as being between −400 mesh and +500 mesh in size. The filler particles 36 may be, but are not required to be, of uniform shape and/or size. In one example, the size of the filler particles 36 may be varied, such that the adhesive core 16 may include filler particles 36 of a single shape in various sizes, or may include filler particles 36 of multiple shapes in various sizes.

In one example, the volume of electrically conductive filler particles 36 distributed in the core layer 10 is at least 2% of the total volume of the core layer 10 after lamination and curing of the laminate structure 100. As the volume of filler particles 36 increases in the adhesive core 16, the bond strength may decrease proportionally, such that in one example, the volume of electrically conductive filler particles 36 distributed in the core layer 10 is less than 15% after lamination and curing of the laminate structure 100, and in another example is less than 10%. In a preferred example, the volume of electrically conductive filler particles 36 distributed in the core layer 10 is within the range of 2% to 8% of the total volume of the core layer 10 after lamination and curing of the laminate structure 100, in a more preferred example, the volume of electrically conductive filler particles 36 is within the range of 2% to 6%, and in a most preferred example is within the range of 2% to 4% of the total volume of the core layer 10 after lamination and curing of the laminate structure. The volume of electrically conductive filler particles 36 in the adhesive core 16 may also be expressed as a percentage of the total weight of the adhesive core 16 after lamination and curing of the laminate structure 100. In the example of electrically conductive filler particles 36 which are made substantially of aluminum, the percent by weight of aluminum filler particles 36 distributed in the adhesive core 16 can be in the range of 5% to 37.5% of the total weight of the adhesive core 16. As noted previously, the bond strength of the bond interface between the core layer 10 and the aluminum sheets 12, 14 may decrease with an increase in the volume of filler particles 36, such that in one example the percent by weight of aluminum filler particles 36 distributed in the adhesive core 16 is within the range of 5% to 20%, in a preferred example is in the range of 5% to 15%, and in a more preferred example is in the range of 5% to 10% by weight.

By way of non-limiting example, a method of forming the laminate structure 100 includes presenting the various layers required to form the laminate structure 100 in the required sequence to a laminating process which includes applying a laminating pressure to the sequenced layers and curing the layered structure such that the layers are bonded together to form the laminate structure 100. By way of non-limiting and illustrative example and referring to FIG. 2, the laminate structure 100 is formed by cleaning the aluminum sheets 12, 14, as previously described herein, to deoxidize the surfaces of the aluminum sheets 12, 14. The inwardly facing surfaces of the aluminum sheets 12, 14, e.g., the surfaces which are to be bonded to the adhesive core 16, are respectively coated with the intermediate layers 22, 24, for example by spray, roller and/or immersion application of the coating material forming the intermediate layers 22, 24, where the applied coating material is wetted out, e.g., distributed, on the inwardly facing surfaces of the aluminum sheets 12, 14 such that the coating material covers the entire surface of the aluminum sheet 12, 14, e.g., is coextensive with the surface of the aluminum sheet 12, 14, at a uniform coating thickness sufficient to provide the desired thickness of the respective intermediate layers 22, 24 after laminating and curing the laminate structure 100. In one example, coating material may be applied to the exterior (outwardly facing) surfaces of the aluminum sheets 12, 14 to form the exterior layers 28, 26, for example, by spray, roller and/or immersion application, and wetted out, e.g., distributed, on the outwardly facing surfaces of the aluminum sheets 12, 14 such that the coating material covers the entire surface of the aluminum sheet 12, 14, e.g., is coextensive with the surface of the aluminum sheet 12, 14, at a uniform coating thickness sufficient to provide the desired thickness of the respective exterior layers 28, 26 after laminating and curing the laminate structure 100. The coating material may be solvent based, such that the aluminum sheets 12, 14 may be subjected to a drying operation to dry and/or cure the intermediate layers 22, 24 and/or the exterior layers 26, 28, which may include air drying or exposing the coated aluminum sheets 12, 14 to heat provided by one or more of a flame bar, incinerator oven, baking oven, infrared, etc., as required to dry and/or cure the intermediate layers 22, 24 and exterior layers 28, 26. In another example, the laminate structure 100 may be laminated without one or both of the exterior layers 28, 26, and/or one or both of the exterior layers 28, 26 may be applied to the laminate structure 100 after lamination and curing of the laminate structure 100, for example, as a paint or e-coat layer, or an isolation layer 36, as previously described herein.

Still referring to the illustrative example shown in FIG. 2, and after forming the intermediate layers 22, 24, the exterior layers 28, 26 on the aluminum sheets 12, 14, the adhesive material forming the adhesive core 16 is applied in two layers 18, 20, where the adhesive layer 18 is applied to the intermediate layer 22 and the adhesive layer 20 is applied to the intermediate layer 24. The adhesive material may be applied, for example, by spraying or rolling, and subjected to a drying operation, may be applied using a hot melt or rolling method subjected to a curing operation such as an ultraviolet (UV) cure, or may be applied as a dry adhesive film. The applied adhesive material is wetted out, e.g., distributed, such that the adhesive material covers the entire surface of the aluminum sheet 12, 14, e.g., is coextensive with the surface of the aluminum sheet 12, 14, at a uniform coating thickness sufficient to provide the thickness of the respective adhesive layers 18, 20 required to provide desired thickness of the adhesive core 16 after laminating and curing the laminate structure 100. The aluminum sheet 12, including the intermediate layer 22 and the adhesive layer 18 sequenced as shown in FIG. 2, and the aluminum sheet 14, including the intermediate layer 24 and the adhesive layer 20 sequenced as shown in FIG. 2, are presented to the laminating process, e.g., to laminating rolls such that the adhesive layers 18, 20 are facing, e.g., are brought in contact with each other, and laminated by applying a laminating pressure, for example, via the laminating rolls, to form the laminate structure 100. Alternately, as shown in FIG. 1 and previously described herein, the adhesive material forming the adhesive core 16 may be applied in a single layer to one of the intermediate layers 22, 24.

The laminate structure 100 is cured by elevating the temperature of the aluminum sheets 12, 14 and the adhesive core 16, for example, using one or more ovens, flame bars, heated lamination rolls, etc. during and/or after the lamination process forming the laminate structure 100. In one example, at presentation to the laminating rolls and/or during application of the laminating pressure to form the laminate structure 100, the aluminum sheets 12, 14 are maintained at approximately the same temperature to minimize warpage of the laminate structure 100 by providing uniform expansion and contraction of each of the aluminum sheets 12, 14 relative to the other of the aluminum sheets 12, 14. As used herein, "approximately the same temperature" is defined as the temperature of one of the aluminum sheets 12, 14 is maintained within 100 degrees Fahrenheit, and preferably within 50 degrees Fahrenheit, of the other of the aluminum sheets immediately prior to and/or during lamination to equalize the residual thermal stresses and/or thermal expansion and/or contraction of the aluminum sheets 12, 14.

Following the lamination process, e.g., after laminating and curing the sequenced layers forming the laminate structure 100, the laminate structure 100 may be subjected to additional treatments, including, as previously described herein, the application of one or more of the exterior layers 26, 28, 34. The laminate structure 100 may be used to form components therefrom. For example, the laminate structure 100 may be cut, stamped, pressed, bent, extruded, punched, drilled, etc. to form a component, where the component may define one or a combination of one or more bends, fillets, chamfers, shoulders, openings, holes, slots, ribs, flanges, hems, etc. By way of non-limiting example, the laminate structure 100 may be used to form a variety of structural components which may be used in vehicles, such as a dash panel, package tray, panel shelf, seat panel, cowl panel, instrument panel frame, floor panel, tunnel panel, wheel well, back-up panel, trunk panel, etc. The examples are non-limiting, and it would be understood that various components which may be structural or non-structural components, may be formed using the laminate structure 100 described herein.

The laminate structure 100 and/or a component formed therefrom may be fastened to another component by use of various means of attachment. In one example, an adhesive, such as a structural adhesive, can be used to bond the laminate structure 100 and/or component formed therefrom to another component or structure. The laminate structure 100 in this example may include an exterior coating 26, 28 which is configured to passivate the exterior surface of the aluminum sheet 12, 14 to which the attaching adhesive is being applied and/or to contribute to the bond strength of the bonded interface formed between the laminate structure 100 and the attaching adhesive. In a non-limiting example, the attaching adhesive may be an epoxy type structural adhesive. In one example, the laminate structure 100 includes the isolation layer 34 on the attachment surface, for example, to prevent ion transfer via the attaching adhesive through the isolation layer 34, where ion transfer may occur from a component, such as a steel component, to which the laminate structure 100 is attached, such that galvanic corrosion is prevented at the attachment interface between the attaching adhesive and the laminate structure 100.

In another example, a mechanical means of attachment, using a fastener such as a rivet, bolt, clamping element, crimping element, etc. may be used to fasten the laminate structure 100 and/or component formed therefrom to another component or structure, where the fastener, e.g., the rivet, bolt, etc. is attached via an opening, such as a hole or slot, formed in the laminate structure 100, where the opening formed in the laminate structure 100 to receive the fastener can include an edge surface exposing the core layer 10 to the attaching fastener. By way of non-limiting example, the fastener may be a rivet such as a pop rivet, self-piercing rivet, Henrob™ rivet, blind rivet, etc. In another example, the fastener may be a bolt, which may be a standard bolt, a lock bolt, a Huck bolt, etc. In another example, the fastener may be a clamping element or crimping element which is tightened or distorted in contact with the laminate structure 100 to attach the laminate structure (or component formed therefrom) to another component or structure, where the clamping or crimping element may be tightened around a portion or the laminate structure 100 including but not limited to an edge portion of the laminate structure 100.

As discussed for the adhesive means of attachment, the laminate structure 100 may include an exterior coating 26, 28 and/or an isolation layer 34 to prevent corrosion of the laminate structure 100 at the attachment interface between the laminate structure 100 and the fastener and/or the attachment interface between the laminate structure 100 and the attached component. The fastener may be an aluminum fastener, a galvanized fastener, a coated fastener, or otherwise treated or configured to prevent corrosion of the laminate structure 100 at the attachment interface between the fastener and the laminate structure. In one example, the attached component may be a steel component which is placed in contact with and/or abutted to the laminate structure 100, and attached to the laminate structure 100 by the fastener. The isolation layer 34 of the laminate structure 100 is disposed between one of the aluminum sheets 12, 14 of the laminate structure 100 which is adjacent the steel structure to prevent ion transfer from the steel component and/or to prevent galvanic corrosion of the laminate structure 100. The laminate structure 100 may include one or more auxiliary layers 30, 32, which may be configured, as previously discussed herein, to prevent the ingress of corrosive elements at an exposed edge of the laminate structure 100 in contact with the fastener, and to prevent ingression of a contaminant or corrosive elements into the bonded interface between the adhesive core 16 and the aluminum layers 12, 14. For example, the exposed edge of the laminate structure 100 may be an edge of the laminate structure defining the opening to receive the fastener, or an exposed edge of the laminate structure 100, such as a cut edge or exterior edge of the component formed from the laminate structure 100, to which a fastener such as a clamp or crimping element may be attached.

In another example, the laminate structure 100 and/or component formed therefrom may be attached to another component or structure by welding, e.g., by forming a weld between the laminate structure 100 and the component or structure to which the laminate structure 100 is attached. In this example, the laminate structure 100 can be configured as shown in FIG. 4 as an electrically conductive laminate structure 100. As previously discussed herein, the electrically conductive laminate structure 100 includes core layer 10 and/or adhesive core 16 which includes electrically conductive filler particles 16 that are shaped, sized, and/or dispersed within the adhesive core 16 to provide an electrically conductive path through the adhesive core 16. In a preferred example, the laminate structure 100 to be welded to another component or structure includes an adhesive core 16 made of a polymer based adhesive in which aluminum filler particles 36 are dispersed. Preferably the aluminum filler particles 36 are shaped, sized and dispersed in the adhesive core 16 such that the adhesive core 16 has a conductivity substantially the same as the aluminum sheets 12, 14, such that the resistivity of the laminate structure 100 is substantially uniform through its thickness and to prevent expulsion of the adhesive core 16 from the laminate structure 100 during forming of the weld. The laminate structure 100 as described in the present example is suitable for attachment by welding to another component or structure using, for example, resistive spot welding, cold metal transfer welding also known as cold metal fusion welding, delta strip welding also known as continuous strip welding, etc.

The illustrative examples provided by the description herein and the related figures are non-limiting, and it would be understood that a plurality of alternative configurations of the layers of the laminate structure 100 exist within the scope of the description incorporating various combinations of the metal sheets 10, 12, configurations of the core layer 10, various configurations of the adhesive core 16, and various combinations and/or configurations of one or more of intermediate layers 22, 24, auxiliary layers 30, 32, exterior layers 26, 28, separating layers 34, and/or filler particles 36 to provide a laminate structure 100 characterized by a combination of properties and/or features as required by the specified application and/or use of the laminate structure 100 and/or a component formed therefrom. The combination of properties and/or features for which a laminate structure 100 is configured includes a combination of one or more of NVH properties, damping, elongation, tensile strength, shear strength, formability, peel strength, corrosion prevention, thermal properties, and/or electrical conductivity. The example configurations of laminate structures 100 shown in FIGS. 1-4 and the CLF behavior of the laminate structures 100 represented by the CLF curves 44, 46, 48 are non-limiting, and it would be understood that the various layers shown in the figures may be alternatively combined to provide other configurations of the laminate structure 100 not shown in the figures but included in the scope of the description.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method of making a laminate structure, the method comprising:
   providing a first metal sheet;
   providing a second metal sheet;
   wherein each of the first and second metal sheets are made of an aluminum based material and include an inwardly facing surface;
   applying an intermediate layer to the inwardly facing surfaces of the first and second metal sheets at a consistent thickness and coextensive with the inwardly facing surface to passivate the inwardly facing surface;
   wherein the intermediate layer includes one of titanium, zirconium, and tri-chromium oxide;
   applying an adhesive core material to the inwardly facing surface of the first metal sheet at a uniform thickness and coextensive with the inwardly facing surface, such that the intermediate layer is disposed between the adhesive core material and first metal sheet;
   wherein the adhesive core material is made of a viscoelastic material;
   laminating the first metal sheet to the second metal sheet such that the adhesive core material is disposed between the first and second metal sheets to form the laminate structure; and
   wherein the steps of applying the intermediate layer, applying the adhesive core material, and laminating the first metal sheet to the second metal sheet are performed sequentially in a continuous operation.

2. The method of claim 1, further comprising:
   applying a deoxidation cleaner to the inwardly facing surfaces of the first and second metal sheets immediately prior to applying the intermediate layer;
   wherein the steps of applying the deoxidation cleaner, applying the intermediate layer, applying the adhesive core material, and laminating the first metal sheet to the second metal sheet are performed sequentially in a continuous operation.

3. The method of claim 1, wherein the viscoelastic material is made of a phenolic modified rubber material.

4. The method of claim 1, further comprising:
   applying the adhesive core material to the inwardly facing surface of the second metal sheet at a uniform thickness and coextensive with the inwardly facing surface, such that the intermediate layer is disposed between the adhesive core material and second metal sheet.

5. The method of claim 1, wherein the adhesive core viscoelastic material is made of a polyester based material.

6. The method of claim 1, wherein the laminate structure has a composite loss factor which is continuously greater than 0.1 within a temperature range of 15 degrees Celsius to 70 degrees Celsius.

7. The method of claim 1, wherein the laminate structure has an adhesive strength as measured by T-peel of at least 1.75 Newtons/millimeter (N/mm).

8. The method of claim 1, wherein the laminate structure has one of an n value of 0.1 or greater, or, an r value of 0.8 or greater.

9. The method of claim 1, wherein laminating the first metal sheet to the second metal sheet such that the adhesive core material is disposed between the first and second metal sheets to form the laminate structure further comprises:
   heating the first metal sheet to a first elevated temperature;
   heating the second metal sheet to a second elevated temperature;

wherein the first elevated temperature and the second elevated temperature differ by no more than 100 degrees Fahrenheit; and applying a laminating pressure to the heated first metal sheet, adhesive core material and heated second metal sheet such that the adhesive core material is bonded to the first and second metal sheets to form the laminate structure.

10. The method of claim 9, wherein the first elevated temperature and the second elevated temperature differ by no more than 50 degrees Fahrenheit.

\* \* \* \* \*